US011076709B2

(12) United States Patent
Gillespie

(10) Patent No.: US 11,076,709 B2
(45) Date of Patent: Aug. 3, 2021

(54) MOUNTING ASSEMBLY

(71) Applicant: GR AND KA GILLESPIE PTY LTD, Tumut (AU)

(72) Inventor: Garry Gillespie, Tumut (AU)

(73) Assignee: GR AND KA GILLESPIE PTY LTD, Tumut (AU)

( * ) Notice: Subject to any disclaimer, the term of this patent is extended or adjusted under 35 U.S.C. 154(b) by 324 days.

(21) Appl. No.: 16/079,882

(22) PCT Filed: Feb. 24, 2017

(86) PCT No.: PCT/AU2017/000057
§ 371 (c)(1),
(2) Date: Aug. 24, 2018

(87) PCT Pub. No.: WO2017/143387
PCT Pub. Date: Aug. 31, 2017

(65) Prior Publication Data
US 2020/0297131 A1  Sep. 24, 2020

(30) Foreign Application Priority Data
Feb. 26, 2016  (AU) ................... 2016900692

(51) Int. Cl.
*A47F 5/08* (2006.01)
*E04B 2/74* (2006.01)
(Continued)

(52) U.S. Cl.
CPC .............. *A47F 5/0815* (2013.01); *E04B 2/74* (2013.01); *E04C 2/40* (2013.01); *E04F 13/08* (2013.01);
(Continued)

(58) Field of Classification Search
CPC .. A47F 5/0815; E04B 2/74; E04C 2/40; E04F 13/08; F16B 5/0044; F16B 5/0056; F16B 5/02; F16B 12/125; A47B 2230/0062
See application file for complete search history.

(56) References Cited

U.S. PATENT DOCUMENTS 2,743,022 A * 4/1956 Mapson ................ A47F 5/0823
211/70.6
2,928,512 A * 3/1960 Slater .................... F16B 37/045
403/22
(Continued)

FOREIGN PATENT DOCUMENTS

CN  204200789 U  3/2015
FR  2182378 A5  12/1973

*Primary Examiner* — James M Ference
(74) *Attorney, Agent, or Firm* — Stinson LLP

(57) ABSTRACT

A mounting assembly (150) for supporting objects, the mounting assembly (150) comprising: at least two adjacent mounting panels (100), each of the mounting panels (100) having a first front surface (102), a second rear surface (104) and a peripheral edge extending between the first front surface (102) and the second rear surface (104); at least one recess (106) provided by the peripheral edge of each of the mounting panels (100), the at least one recess (106) of each of the mounting panels extending from the first front surface (102) towards the second rear surface (104); at least one aperture (108) in the first front surface (102) of each of the mounting panels (100); at least one key (114); and at least one mounting support (326) receivable in the at least one aperture (108) of either of the mounting panels (100), the at least one mounting support (326) configured to support one or more objects. The recesses (106) of the adjacent mounting panels (100) align to form a keyhole (115) and the key (114) is inserted into the keyhole (115) in a direction generally perpendicular to the first front surface (102) thereby interlocking the adjacent mounting panels (100) together.

19 Claims, 10 Drawing Sheets

(51) Int. Cl.
   *E04C 2/40* (2006.01)
   *E04F 13/08* (2006.01)
   *F16B 5/00* (2006.01)
   *F16B 5/02* (2006.01)
   *F16B 12/12* (2006.01)

(52) U.S. Cl.
   CPC .......... *F16B 5/0044* (2013.01); *F16B 5/0056* (2013.01); *F16B 5/02* (2013.01); *F16B 12/125* (2013.01)

(56) References Cited

U.S. PATENT DOCUMENTS

| | | | | | |
|---|---|---|---|---|---|
| 3,094,892 | A | * | 6/1963 | Topf | F16B 13/00 411/42 |
| 3,179,367 | A | * | 4/1965 | Rapata | F16B 12/2027 248/239 |
| 3,255,987 | A | * | 6/1966 | Gatch | F16B 21/02 248/220.31 |
| 3,280,439 | A | * | 10/1966 | McCarthy | F16D 1/112 24/613 |
| 3,443,783 | A | * | 5/1969 | Fisher | F16B 19/00 248/239 |
| 3,680,277 | A | * | 8/1972 | Martin | F16B 5/0052 52/438 |
| 3,910,536 | A | * | 10/1975 | Sharp | H02G 3/045 248/68.1 |
| 3,944,176 | A | * | 3/1976 | Danko | H04Q 1/142 248/68.1 |
| 4,035,097 | A | * | 7/1977 | Bachand | F16B 12/32 403/348 |
| 4,074,496 | A | * | 2/1978 | Fischer | A63H 33/04 52/782.1 |
| 4,212,445 | A | * | 7/1980 | Hagen | F16B 12/34 248/222.52 |
| 4,635,801 | A | * | 1/1987 | Oren | A47F 5/0853 211/70.6 |
| 4,757,967 | A | * | 7/1988 | Delmore | E04B 2/7453 248/218.4 |
| 4,799,637 | A | * | 1/1989 | Fahringer | A47F 5/0823 248/220.43 |
| 4,805,784 | A | * | 2/1989 | Solheim | A47F 5/0846 211/59.1 |
| 4,923,161 | A | * | 5/1990 | Fahringer | A47F 5/0823 248/220.43 |
| 5,154,385 | A | * | 10/1992 | Lindberg | A47B 57/562 248/225.11 |
| 5,405,111 | A | * | 4/1995 | Medlin, Jr. | H02G 3/125 248/205.1 |
| 5,412,912 | A | * | 5/1995 | Alves | A47F 5/0846 211/94.01 |
| 5,503,276 | A | * | 4/1996 | Pierce | A47F 5/0807 211/59.1 |
| 5,531,415 | A | * | 7/1996 | Kallemeyn | A47F 5/0815 211/59.1 |
| 5,813,550 | A | * | 9/1998 | Sheehan | A47F 5/0807 211/87.01 |
| 6,085,916 | A | * | 7/2000 | Kovacevic | A47F 7/24 211/86.01 |
| 6,131,866 | A | * | 10/2000 | Kesinger | A47B 96/067 211/182 |
| 6,443,316 | B1 | * | 9/2002 | Mao | A47F 5/0807 211/41.3 |
| 6,454,230 | B1 | * | 9/2002 | Accuardi | B25H 3/04 248/220.31 |
| 6,460,946 | B1 | * | 10/2002 | Beukema | A47B 43/00 108/152 |
| 6,484,997 | B1 | * | 11/2002 | Edwards | H02G 3/105 248/223.41 |
| 6,591,995 | B1 | * | 7/2003 | Grove | A47F 5/0815 211/87.01 |
| 6,945,414 | B1 | * | 9/2005 | Stevens | A47F 5/0846 211/183 |
| 8,267,259 | B2 | * | 9/2012 | Fisher | A47B 73/004 211/75 |
| 10,405,676 | B1 | * | 9/2019 | Underwood | F16B 45/00 |
| 2001/0002521 | A1 | * | 6/2001 | Maniezzo | A47F 5/0823 52/27 |
| 2004/0069730 | A1 | * | 4/2004 | Woods | A47B 73/00 211/74 |
| 2006/0283821 | A1 | * | 12/2006 | Mast | A47F 5/0815 211/85.2 |
| 2007/0022682 | A1 | * | 2/2007 | Morgenegg | E04B 2/90 52/235 |
| 2010/0051769 | A1 | * | 3/2010 | Tyson | A47F 5/0807 248/220.31 |
| 2010/0212462 | A1 | * | 8/2010 | Anderson | A47F 5/0823 81/121.1 |
| 2011/0155875 | A1 | * | 6/2011 | Hofman | A47F 5/0815 248/220.31 |
| 2012/0174516 | A1 | * | 7/2012 | Mann | E04F 13/0733 52/475.1 |
| 2013/0180202 | A1 | * | 7/2013 | Woods | E04F 13/26 52/710 |
| 2013/0334155 | A1 | * | 12/2013 | Kasza | A47B 57/42 211/75 |
| 2015/0117979 | A1 | * | 4/2015 | Anderson | A47F 5/0823 411/378 |
| 2015/0191911 | A1 | * | 7/2015 | Mann | E04F 13/0805 52/475.1 |
| 2016/0029790 | A1 | * | 2/2016 | Carpenter | A47B 73/00 211/75 |
| 2016/0331131 | A1 | * | 11/2016 | Ghaeni | A47B 73/006 |

* cited by examiner

MOUNTING ASSEMBLY

CROSS-REFERENCE TO RELATED APPLICATIONS

This application claims priority to International Publication Number WO 2017/143387, filed on Feb. 24, 2017, which claims priority to Australian Patent Application No. 2016900692 filed Feb. 26, 2016, both of which are hereby incorporated by reference in their entireties.

FIELD

The present invention relates to a mounting assembly for supporting objects.

The invention has been primarily developed for providing a modular mounting assembly for supporting objects, and will be described hereinafter with reference to that application.

BACKGROUND

Boards that are mounted on a surface and used to support objects are known. These boards are typically large, non-modular, making them difficult for an individual to install on their own.

Further, due to the size of these boards, there are limited configurations of a mounting assembly using multiple boards possible without physically modifying one or more of the boards. Accordingly, these boards do not effectively utilise the surface area of the surface to which they are installed. As will be appreciated, modifying these boards for a particular use is a time consuming and specialized process. These boards are also difficult to attach to a surface and at a horizontal level. The use of complicated fixing systems, drills, etc. make it a difficult task for an ordinary person to install.

Another disadvantage of the above described boards is that they are predominantly designed for industrial use. Accordingly, these boards are heavy and costly.

Object of the Invention

It is an object of the present invention to overcome or at least ameliorate one or more of the foregoing disadvantages.

SUMMARY OF INVENTION

An aspect of the present invention provides a mounting assembly for supporting objects, the mounting assembly comprising:

at least two adjacent mounting panels, each of the mounting panels having a first front surface, a second rear surface and a peripheral edge extending between the first front surface and the second rear surface;

at least one recess provided by the peripheral edge of each of the mounting panels, the at least one recess of each of the mounting panels extending from the first front surface towards the second rear surface;

at least one aperture in the first front surface of each of the mounting panels;

at least one key; and at least one mounting support receivable in the at least one aperture of either of the mounting panels, the at least one mounting support configured to support one or more objects, wherein the recesses of the adjacent mounting panels align to form a keyhole and the key is inserted into the keyhole in a direction generally perpendicular to the first front surface thereby interlocking the adjacent mounting panels together.

In a preferred form, the at least one recess extends from the first front surface to the second rear surface.

In a preferred form, the at least one recess of each of the mounting panels is a dovetail recess.

In a preferred form, the at least one key is a dovetail key.

In a preferred form, an inner surface of each of the at least one recesses has an indentation.

In a preferred form, the at least one key has a protrusion configured to be received within the indentation of the at least one recess of each of the mounting panels, the protrusion and the indentation cooperate to hold the key within the keyhole.

In a preferred form, the mounting support is movable between a locked position and an unlocked position within the aperture.

In a preferred form, moving the mounting support to the locked position comprises rotating the mounting support in a first direction, and moving the mounting support from the locked position to the unlocked position comprises rotating the mounting support in a second direction.

In a preferred form, an inner surface of each of the at least one apertures has a groove.

In a preferred form, the mounting support has a projection configured to cooperate with the groove when moving the mounting support between the locked position and the unlocked position.

In a preferred form, each groove has a locking hole, the locking hole configured to receive the projection of the mounting support when the mounting support is in the locked position.

In a preferred form, the first front surface of each of the mounting panels comprises a V-shaped channel, the V-shaped channel configured to guide a fastener through the mounting panel and into a mounting surface thereby coupling the mounting panel to the mounting surface.

In a preferred form, the at least one recess of each of the mounting panels is one of a plurality of recesses.

In a preferred form, the plurality of recesses of each of the adjacent mounting panels align to form a plurality of keyholes.

In a preferred form, the at least one key is one of a plurality of keys.

In a preferred form, the at least one aperture of each of the mounting panels is one of a plurality of apertures.

In a preferred form, the mounting support is one of a plurality of mounting supports.

BRIEF DESCRIPTION OF DRAWINGS

Preferred embodiments of the invention will now be described, by way of examples only, with reference to the accompanying drawings, wherein like reference numerals refer to similar features throughout the figures, in which.

DESCRIPTION OF EMBODIMENTS

Figure 1:
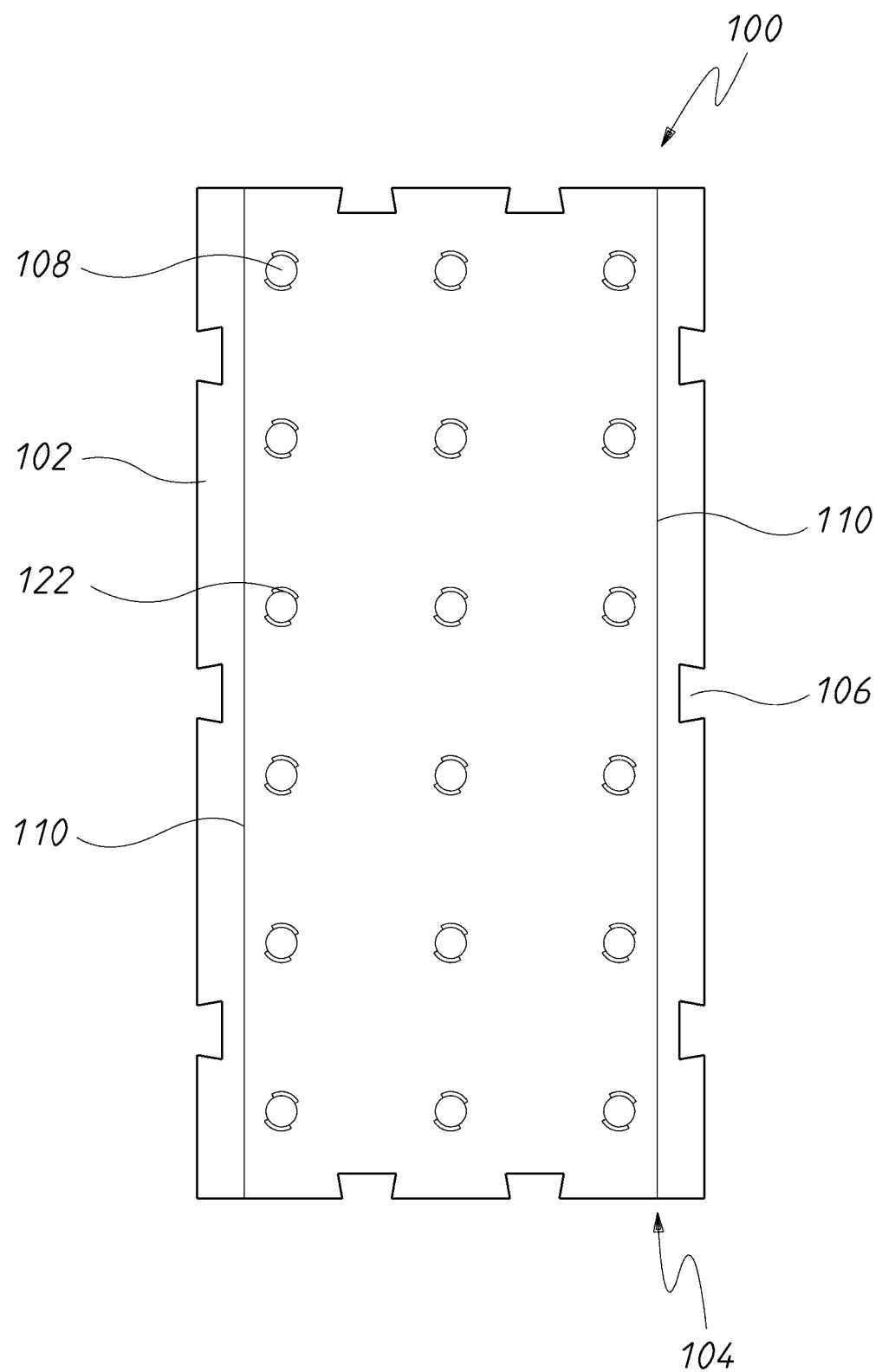
FIG. 1 is a front view of a mounting panel according to a first embodiment of the present invention.
Figure 4:
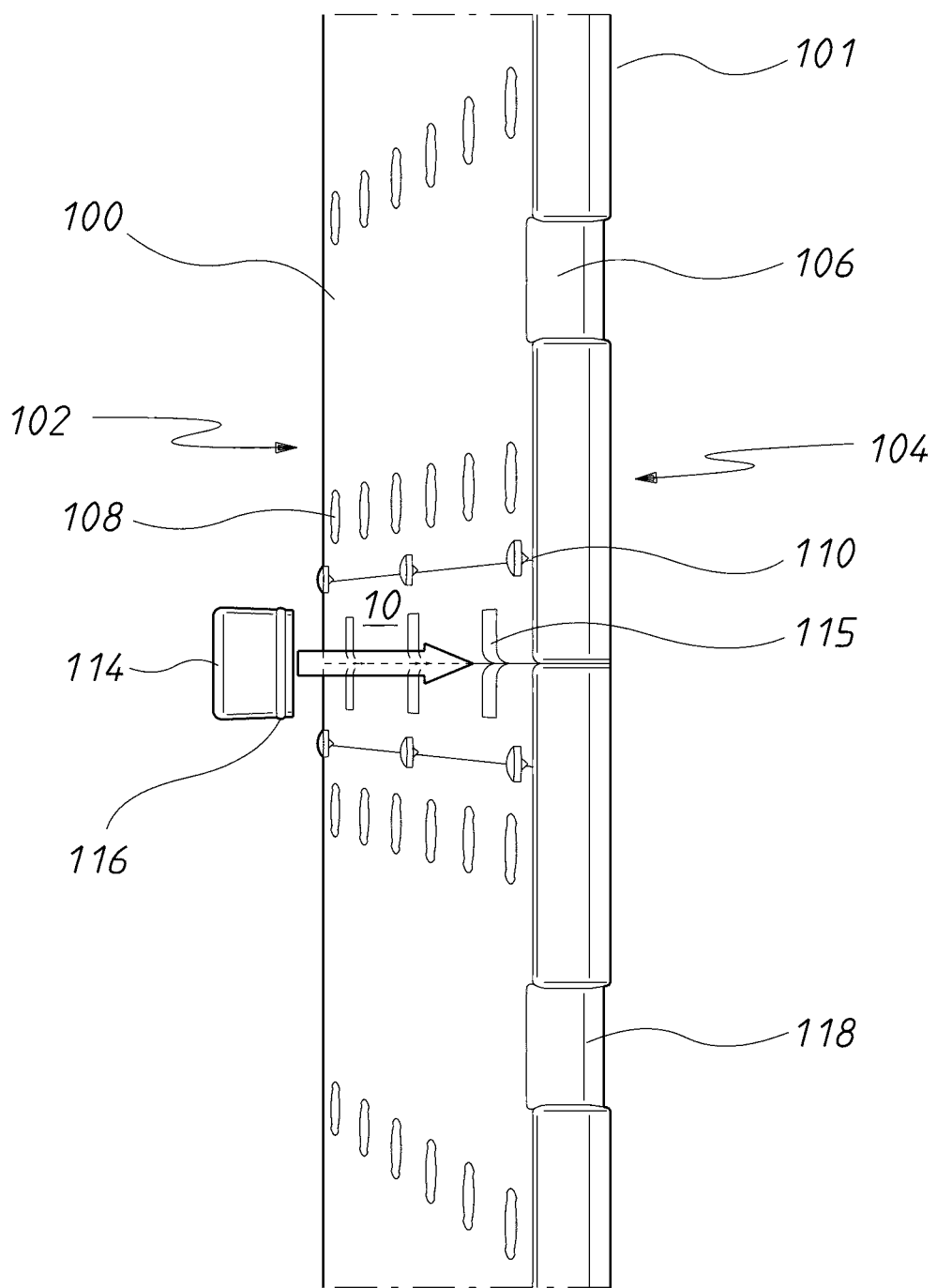
FIG. 4 is a perspective view of installation of the mounting assembly of FIG. 3.
Figure 10:
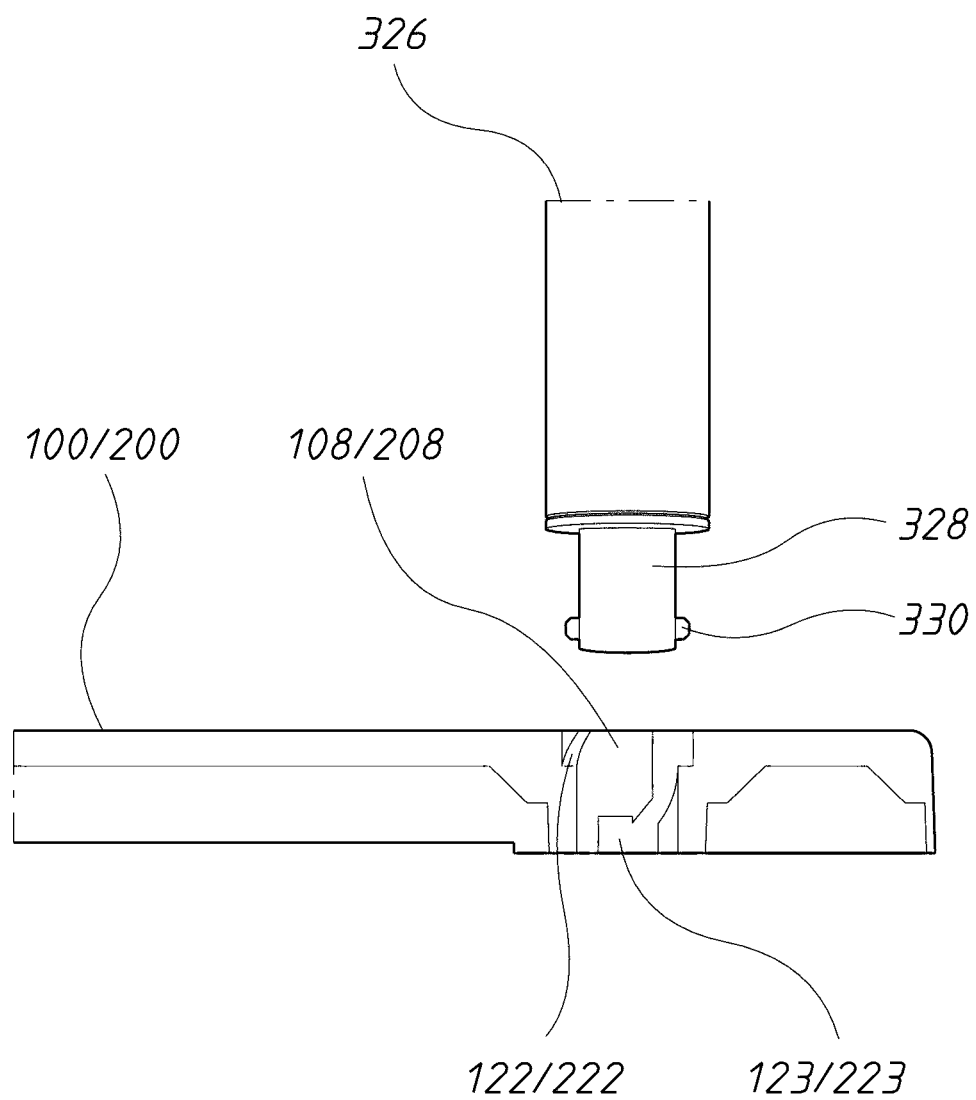
FIG. 10 is cross-sectional view of installation of a mounting support into a mounting panel of either the first and second embodiments.

FIG. 1 shows a mounting panel 100 according to a first embodiment of the present invention. The mounting panel 100 has a front surface 102, a rear surface 104, a peripheral edge extending between the front surface 102 and the rear surface 104, and a series of apertures 108 (only one labelled for clarity of illustration) in the front surface 102. Referring to FIG. 10, the inner surface of each of the apertures 108 has a pair of spiral grooves 122 extending the depth of the aperture 108. At the bottom of each spiral groove 122 there is a locking hole 123. It is also envisaged that internal surfaces other than the spiral grooves 122 may be utilised. Referring to FIG. 4, the inner surface of each of the dovetail recesses 106 has an indentation 118.

It is envisaged that in a preferred embodiment, the dimensions of the mounting panel 100 are 600×300 mm. Although the depicted embodiment shows the mounting panel 100 having a rectangular shape, it will be appreciated that the mounting panel 100 can be in the form of other shapes (e.g. triangular, partially circular, etc.). The depicted embodiment shows the apertures 108 in a grid pattern, however, it will be appreciated that the apertures 108 may be arranged in any pattern.

The mounting panel 100 further comprises one or more dovetail recesses 106 (only one labelled for clarity of illustration) provided by the peripheral edges of the mounting panel 100 and a pair of V-shaped channels 110 extending along the length of the mounting panel 100. As can be seen from FIG. 4, each of the dovetail recesses 106 extend from the front surface 102 to the rear surface 104. It is also envisaged that each of the dovetail recesses 106 may alternatively be formed in the front surface 102 and only partially extend toward the rear surface 104. It is also envisaged that the V-shaped channel 110 may have other shapes, and that the dovetail recesses 106 may also have other shapes.

Figure 2:
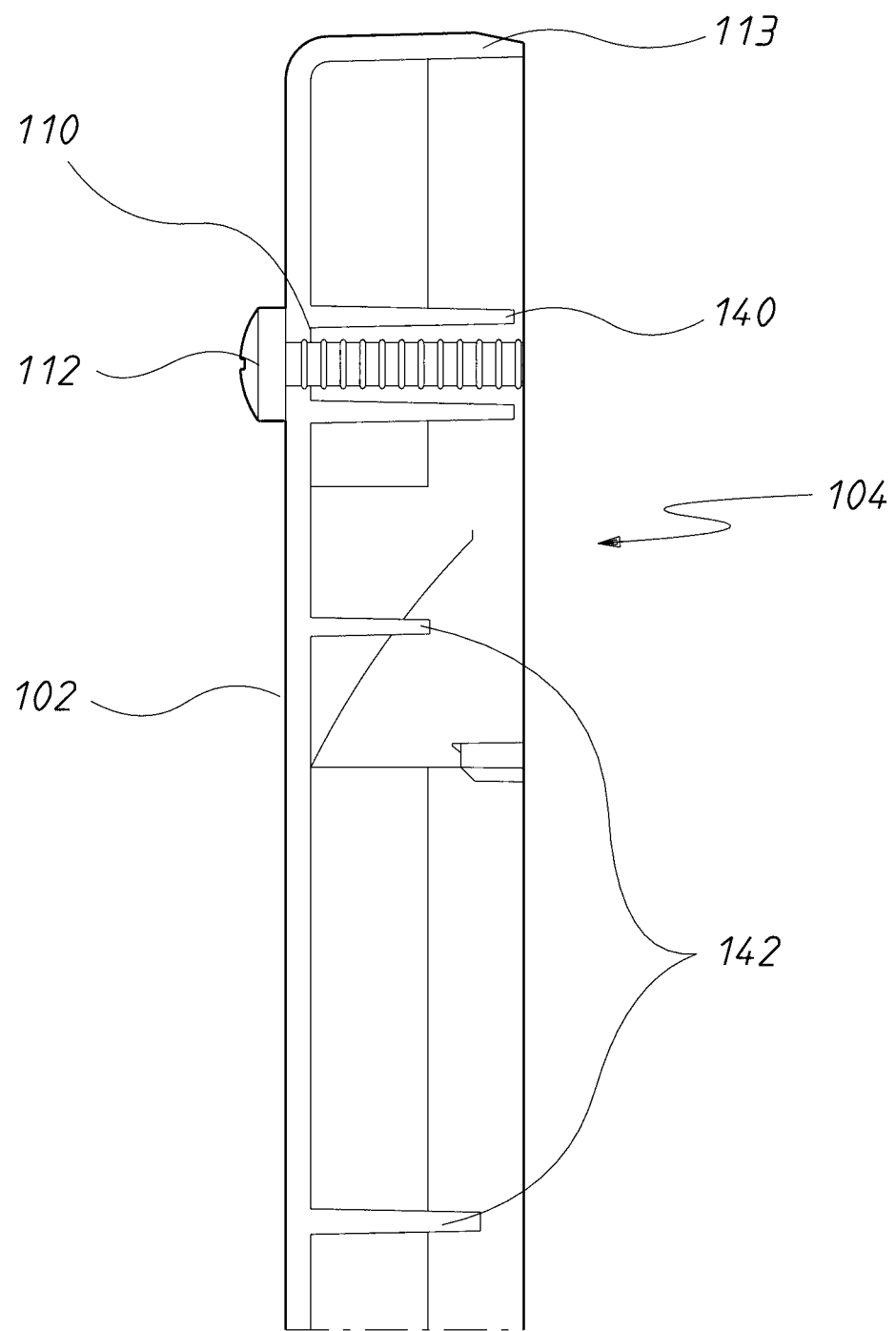
FIG. 2 is a partial cross-section of the mounting panel of FIG. 1.

Referring to FIG. 2, the mounting panel 100 further comprises a rearward facing flange 113 extending along the peripheral edges of the mounting panel 100 and a pair of guiding flanges 140 projecting from the rear surface 104 along either side of each V-shaped channel 110. The mounting panel 100 also has strengthening ribs 142 projecting from the rear surface 104 to improve the strength of the mounting panel 100.

Figure 3:
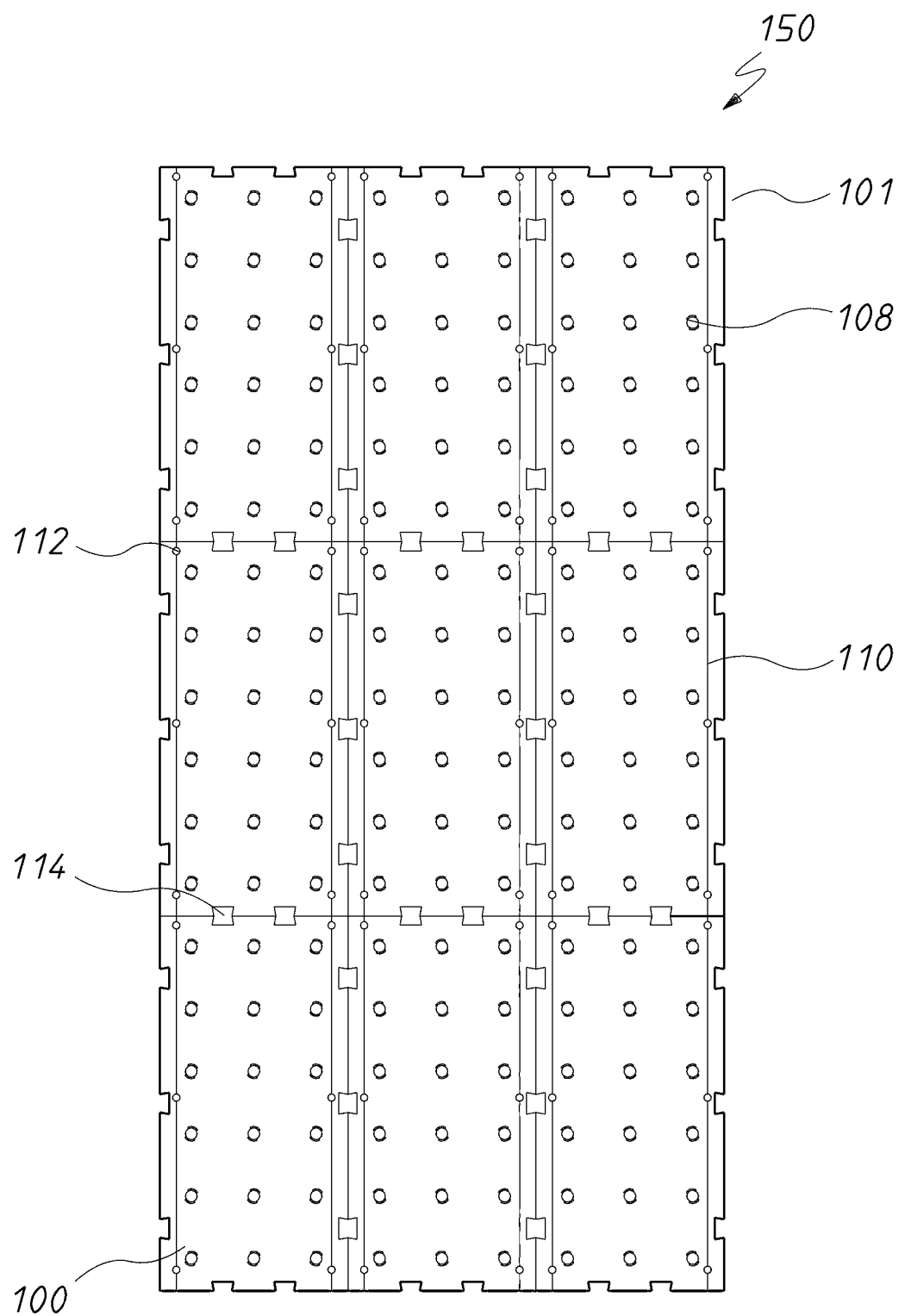
FIG. 3 is a front view of a mounting assembly utilising the mounting panel of FIG. 1.

FIG. 3 shows a mounting assembly 150 installed on a mounting surface 101 (e.g. wall, ceiling, etc.). The mounting assembly 150 comprises a series of the mounting panels 100, a series of dovetail keys 114, and a series of fasteners 112. Referring to FIG. 4, each of the dovetail keys 114 has a protrusion 116. It is envisaged that the dovetail keys 114 may be integrally formed with one of the mounting panels 100, and may be in the form of other shapes.

Installation and assembly of the mounting assembly 150 will now be discussed. Referring to FIG. 2, each of the mounting panels 100 of the mounting assembly 150 is coupled to the mounting surface 101 by the fasteners 112. Although the depicted embodiment illustrates the mounting assembly 150 having a rectangular shape, it will be appreciated that mounting panels 100 having different shapes can be utilised to form mounting assemblies 150 having various shapes and/or configurations. The fasteners 112 are positioned along the V-shaped channels 110. Although FIG. 2 shows the fastener 112 as a self-tapping screw, it will be appreciated that other fasteners known in the art may be used to couple the mounting panel 100 to the mounting surface 101.

The V-shaped channels 110 together with the guiding flanges 140 guide the fasteners 112 through the front surface 102 of the mounting panel 100 and into the mounting surface 101. Being able to position the fasteners 112 anywhere along the V-shaped channels 110 allow the mounting panels 100 to accommodate for different stud distances. It is envisaged that in a preferred embodiment, the fasteners 112 are countersunk into the V-shaped channels 110.

Referring to FIG. 4, the mounting assembly 150 is coupled to the mounting surface 101 such that dovetail recesses 106 of one mounting panel 100 align with dovetail recesses 106 of an adjacent mounting panel 100 to form a dovetail keyhole 115. The dovetail key 114 is inserted into the dovetail keyhole 115 until the protrusion 116 of the dovetail key 114 engages the indentations 118 of adjacent dovetail recess 106 forming a respective dovetail keyhole 115 of adjacent mounting panels 100. Dovetail keys 114 are inserted into each of the dovetail keyholes 115 in the mounting assembly 150 in a direction generally perpendicular to the front surface 102 as indicated by arrow 10 (see FIG. 4), thereby interlocking each adjacent mounting panel 100 in the mounting assembly 150 together. This provides a more stable and sturdier mounting assembly, as loads applied to one mounting panel 100 may be transferred to another mounting panel 100 in the mounting assembly 150.

Figure 5:
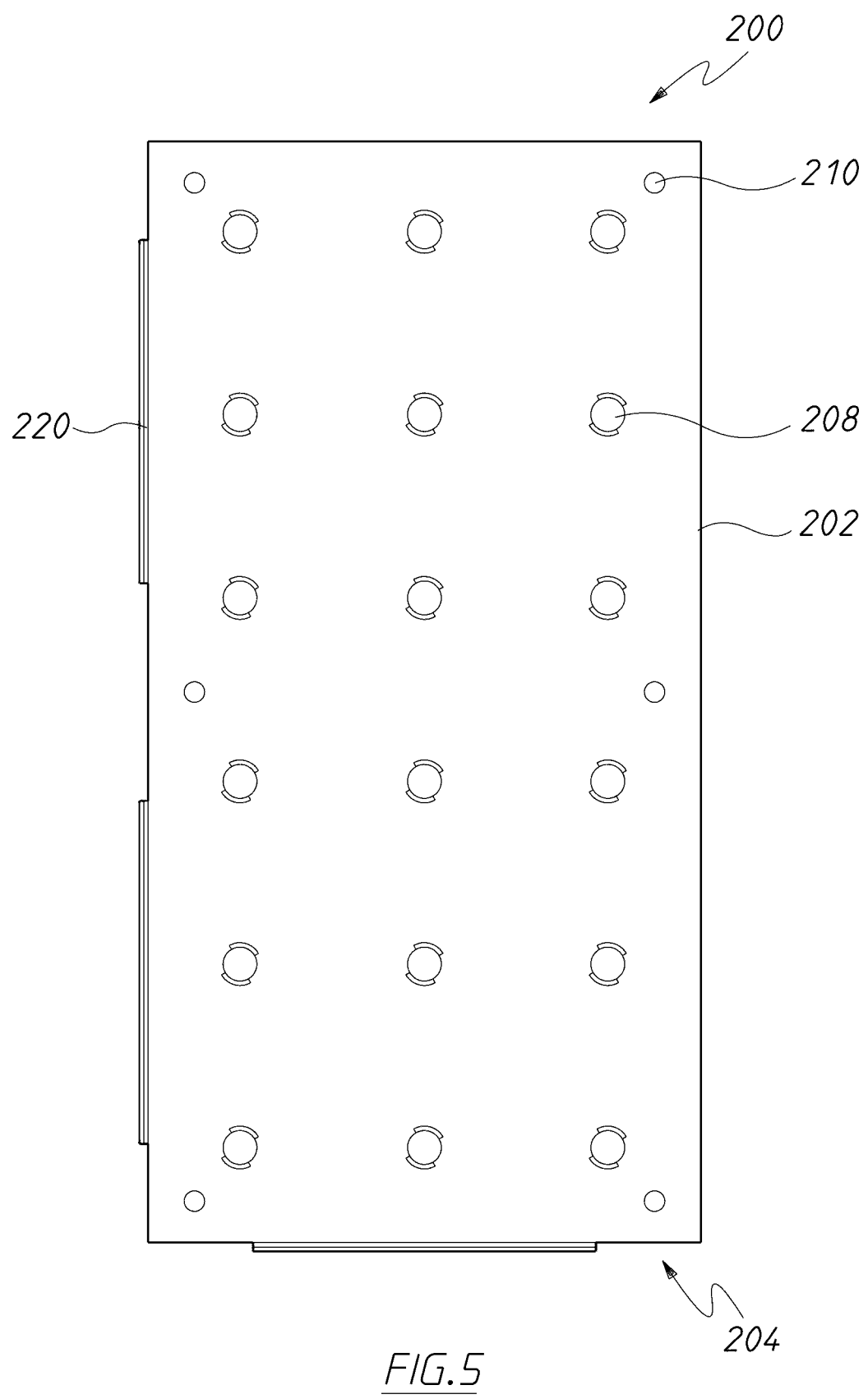
FIG. 5 is a front view of a mounting panel according to a second embodiment of the present invention.

FIG. 5 shows a mounting panel 200 according to a second embodiment of the present invention, where like reference numerals refer to similar features described above.

The mounting panel 200 is similar to the mounting panel 100 of FIG. 1 but does not have a series of dovetail recesses or a pair of V-shaped channels. The mounting panel 200 instead has a series of snap hooks 220 (only one labelled for clarity of illustration) and a series of fastener apertures 210 (only one labelled for clarity of illustration) in the front surface 202. It will be appreciated that the snap hooks 220 can be integrally formed with one of the mounting panels 200 or be an independent component applied to the mounting panels 200. Although the depicted embodiment illustrates the mounting panel 200 having three snap hooks 220, it will be appreciated that any number of snap hooks 220 may be utilized.

It is envisaged that in a preferred embodiment, the dimensions of the mounting panel 200 are 600×300 mm. Although the depicted embodiment shows the mounting panel 200 having a rectangular shape, it will be appreciated that the mounting panel 200 can be in the form of other shapes (e.g. triangular, partially circular, etc.). The depicted embodiment shows the apertures 208 in a grid pattern, however, it will be appreciated that the apertures 208 may be arranged in any pattern.

Figure 6:
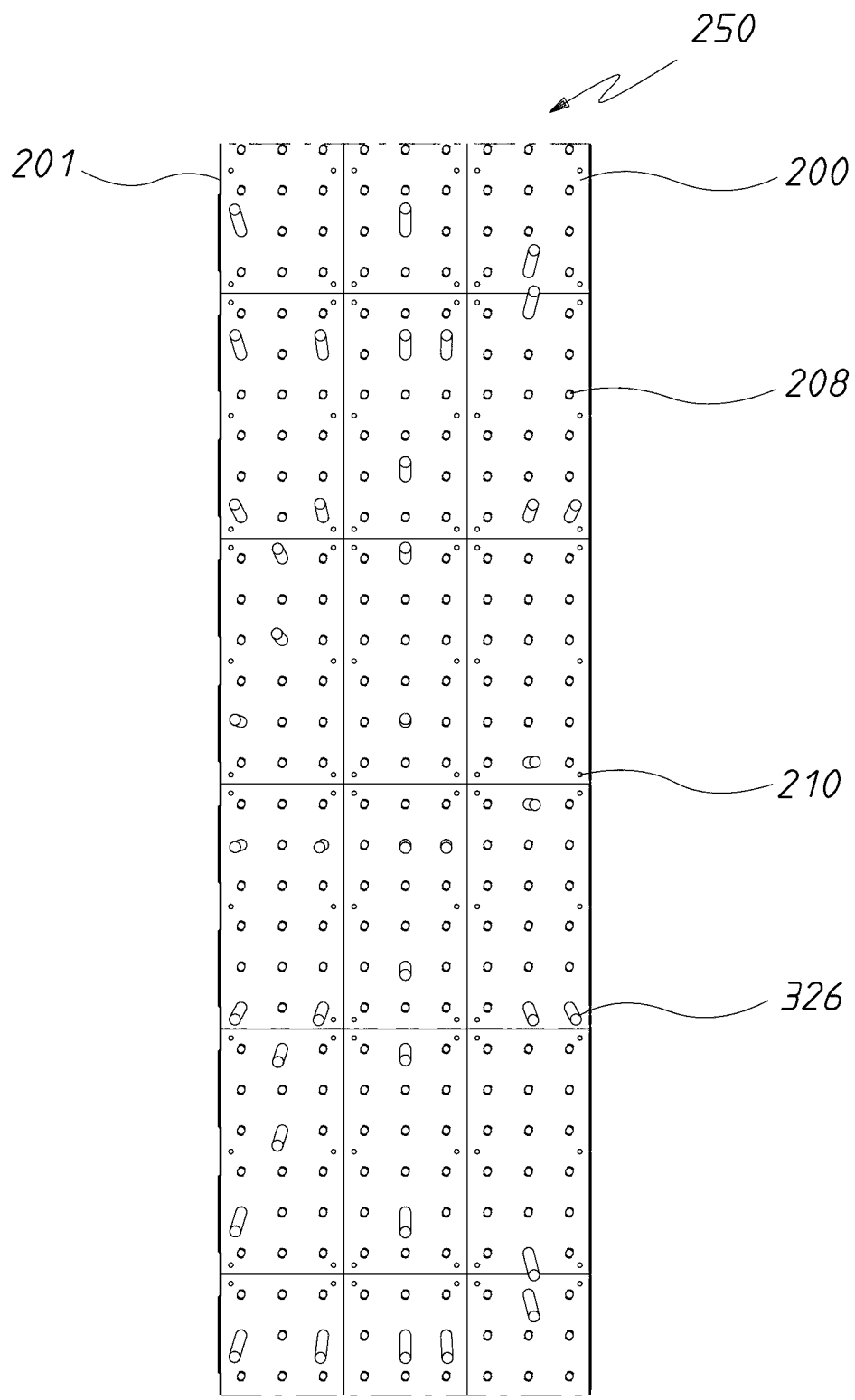
FIG. 6 is a front view of a mounting assembly utilising the mounting panel of FIG. 5.

FIG. 6 shows a mounting assembly 250 installed on a mounting surface 201 (e.g. wall, ceiling, etc.). The mounting assembly 250 comprises a series of mounting panels 200, a series of fasteners 212 (see FIG. 8) and a series of mounting supports 326 (only one labelled for clarity of illustration).

The mounting supports 326 will be discussed in more detail below with reference to both mounting panels 100 and 200.

Figure 7:
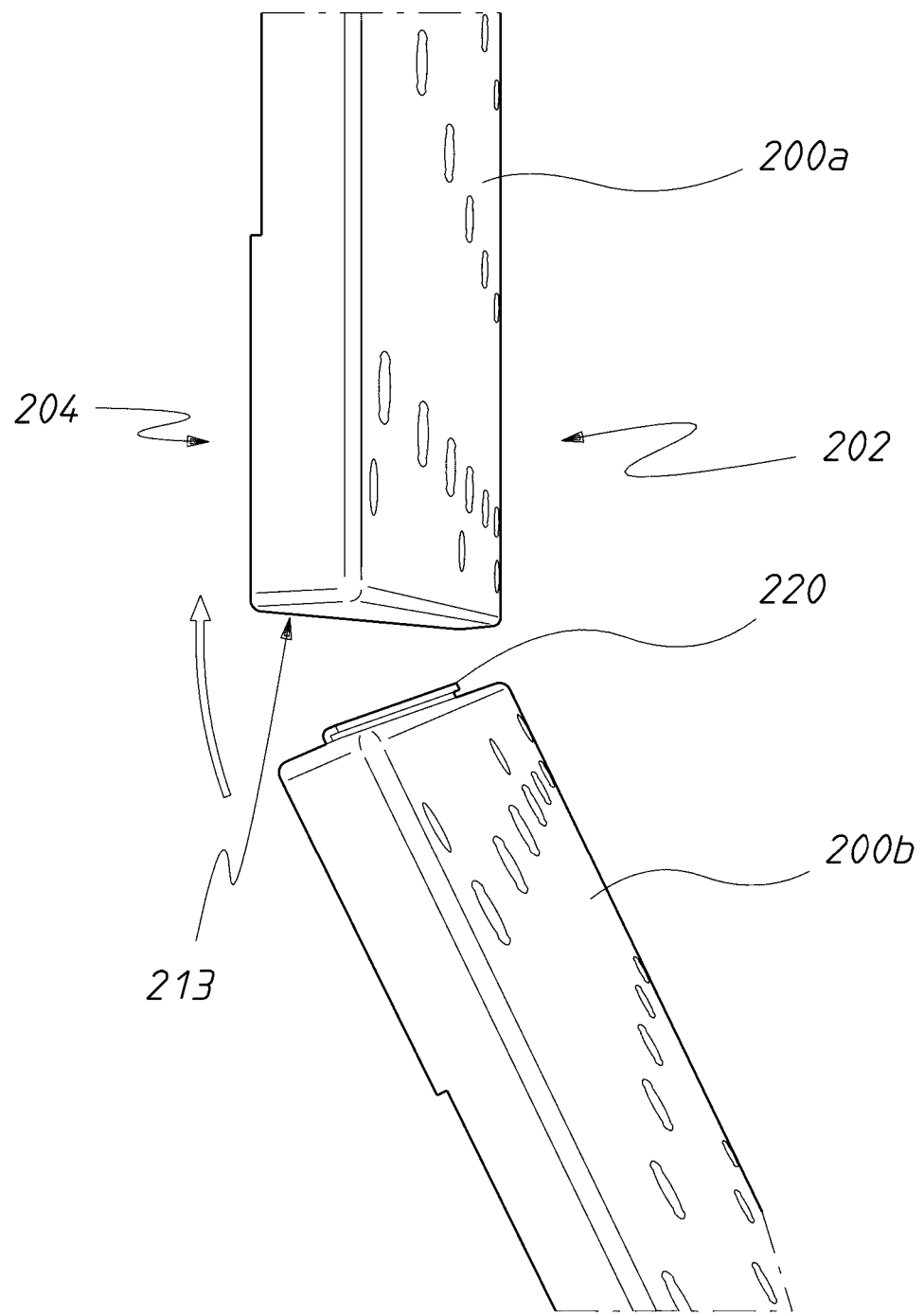
FIG. 7 is a perspective view of interconnection of the mounting panels of FIG. 5.

Installation and assembly of the mounting assembly 250 will now be discussed. Although the depicted embodiment illustrates the mounting assembly 250 having a rectangular shape, it will be appreciated that mounting panels 200 having different shapes can be utilised to form mounting assemblies 250 having various shapes and/or configurations. Referring to FIG. 7, adjacent mounting panels 200 are connected to each other by positioning the snap hooks 220 of the mounting panel 200b behind the mounting panel 200a such that the snap hooks 220 of the mounting panel 200b engage with the rearward facing flange 213 of the mounting panel 200a, thereby interlocking both mounting panels 200a and 200b together.

Figure 8:
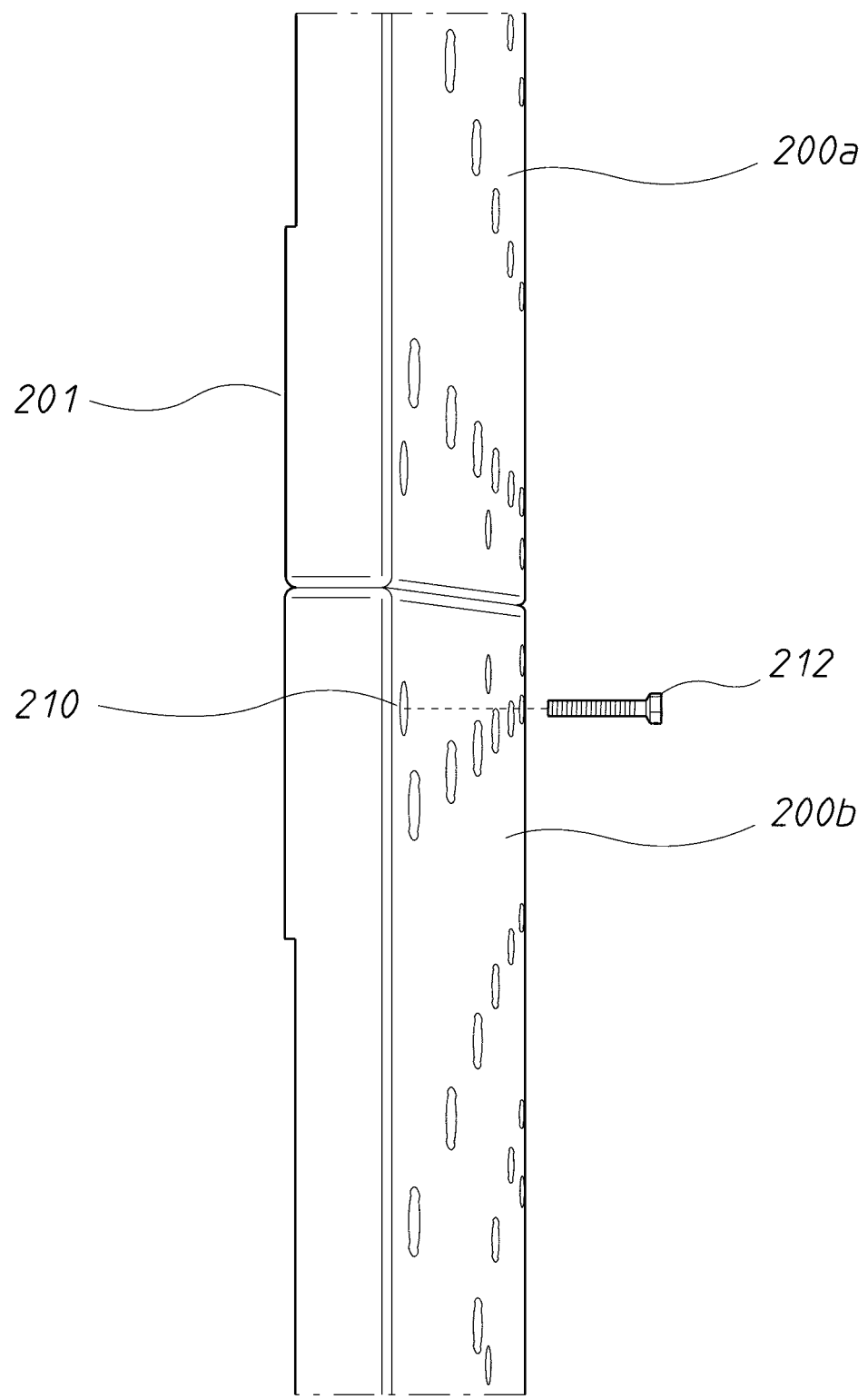
FIG. 8 is a perspective view of installation of the mounting panels of FIG. 5.

Referring to FIG. 8, after adjacent mounting panels 200 of the mounting assembly 250 are interconnected, they are coupled to the mounting surface 201 by the fasteners 212. The fasteners 212 extend through respective fastener apertures 210 in the front surface 202 of the mounting panel 200 and into the mounting surface 201. This provides a more stable and sturdier mounting system, as loads applied to one mounting panel 200 may be transferred to another mounting panel 200 in the mounting assembly 250. Although FIG. 8 shows the fastener 212 as a bolt, it will be appreciated that other fasteners known in the art may be used to couple the mounting panels 200 to the mounting surface 201. It is envisaged that in a preferred embodiment, the fasteners 212 are countersunk into respective fastener apertures 208.

Figure 9:
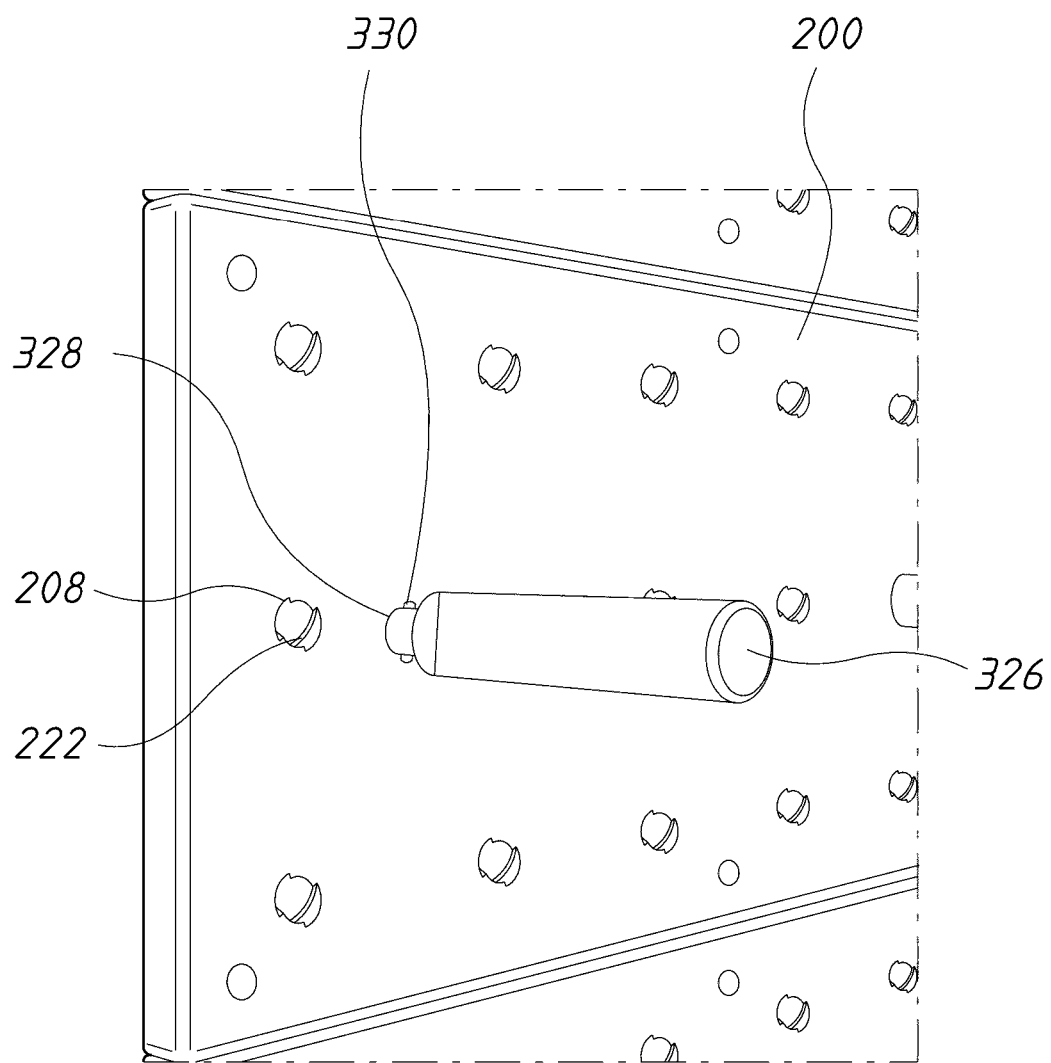
FIG. 9 is a perspective view of installation of a mounting support into a mounting panel of either the first and second embodiments.

FIG. 9 illustrates one of the mounting supports 326 (e.g. pegs). Although FIG. 9 illustrates installation of the mounting supports 326 into the mounting panels 200, it will be appreciated that installation of the mounting supports 326 into the mounting panels 100 is the same. Although the depicted embodiment shows the mounting supports 326 as pegs, it will be appreciated that they may have other shapes for supporting objects. It is also envisaged that the mounting support 326 may be hooks for supporting objects.

Referring to FIG. 9, the mounting support 326 has a key portion 328 and key projections 330 projecting from a surface of the key portion 328. Referring to FIG. 10, the key portion 328 of the mounting support 326 is dimensioned to be received in the apertures 108/208. It is also envisaged that the key projections 330 may be spring-loaded in a biased extended position and be able to move to a retracted position within the key portion 328.

When the key portion 328 is inserted in the aperture 108/208, the key projections 330 engage with the spiral grooves 122/222 of the aperture 108/208. Whilst the key portion 328 is inserted in the aperture 108/208, the key projections 330 and spiral grooves 122/222 cooperate when rotating the mounting support 326 to move the mounting support 326 between a locked position and an unlocked position within the aperture 108/208. To move the mounting support 326 into the locked position, the mounting support 326 is rotated until the key projections 330 are received within respective locking holes 123/223 of the spiral grooves 122/222. To move the mounting support 326 from the locked position to the unlocked position, the mounting support 326 is rotated in the opposite direction to that required when moving the mounting support 326 into the locked position. The mounting supports 326 can be used to support various objects thereon that are required to be mounted on a surface permanently or temporarily. It is envisaged that in a preferred embodiment, a half turn action of each mounting support 326 moves the mounting support 326 between the locked and unlocked positions in a respective aperture 108/208.

Although not illustrated, a double-sided adhesive strip can be applied to the rear surfaces 104, 204 of the mounting panels 100 and 200 to engage the mounting surface 101,201. This is to improve the load bearing capabilities of each of the mounting panels 100, 200 and, therefore, the load bearing capabilities of the mounting assemblies 150, 250. Alternatively, the double-sided adhesive strip can be used to attach the mounting panels 100, 200 to the surface 101,201 without the use of fasteners 112, 212. It is envisaged that in a preferred embodiment, three strips of the double-sided adhesive strips are applied to the rear surfaced 104, 204 of the mounting panels 100, 200. It is also envisaged that in a preferred embodiment, the double sided adhesive tape is at least substantially round in cross-section.

It will be appreciated that features described in relation to one of the mounting panels 100, 200 may also be included in the other of the mounting panels 100, 200.

The mounting assemblies described above are advantageous over known mounting devices. The mounting panels 100 and 200 are capable of providing a mounting assembly that is customizable to suit a wide variety of needs, sizes, configurations, etc. As will be appreciated, the mounting panels 100 and 200 allow for mounting support 326 configurations that are able to accommodate a wide range of objection to be supported thereon. Further, the mounting panels 100 and 200 are simple to install and interconnect, thereby providing for easy installation of a customizable mounting assembly that can be used to mount a wide variety of objects thereon.

The mounting assemblies 150, 250 can be designed for many purposes. In particular, the mounting assemblies 150, 250 can be designed for inside and/or outside use, and can also be designed for domestic, commercial and industrial applications. The mounting panels 100, 200 allow for simple installation of a mounting assembly in a relatively short period of time.

Although the invention has been described with reference to preferred embodiments, it will be appreciated by persons skilled in the art that the invention can be embodied in other forms. For example, the mounting panels 100 and 200 can be manufactured having different shapes, number of apertures and number of dovetail recess.

The invention claimed is:

1. A mounting assembly for supporting objects, the mounting assembly comprising:
   at least two adjacent mounting panels, each of the mounting panels having a first front surface, a second rear surface and a peripheral edge extending between the first front surface and the second rear surface;
   at least one aperture in the first front surface of each of the mounting panels, the at least one aperture extending from the first front surface to the second rear surface, thereby defining an inner surface of the at least one aperture; a spiral groove extending along the inner surface of the at least one aperture; and
   at least one mounting support receivable in the at least one aperture of either of the mounting panels, the at least one mounting support having two projections to cooperate and engage with the spiral groove to secure the mounting support in the aperture when the mounting support is moved from an unlocked position to a locked position within the aperture, wherein the at least one mounting support is configured to support one or more objects;

wherein the two projections are biased in an extended position and able to move to a retracted position within the mounting support.

2. The mounting assembly of claim 1, wherein moving the mounting support to the locked position comprises rotating the mounting support in a first direction, and moving the mounting support from the locked position to the unlocked position comprises rotating the mounting support in a second direction.

3. The mounting assembly of claim 1, wherein the first front surface of each of the mounting panels comprises a V-shaped channel, the V-shaped channel configured to guide a fastener through the mounting panel and into a mounting surface thereby coupling the mounting panel to the mounting surface.

4. The mounting assembly of claim 3, wherein the at least one aperture of each of the mounting panels is one of a plurality of apertures.

5. The mounting assembly of claim 4, wherein the mounting support is one of a plurality of mounting supports.

6. The mounting assembly of claim 5, wherein when the mounting support is located inside the aperture, the mounting support is rotatable 180 degrees to move from the unlocked position to the locked position.

7. The mounting assembly of claim 1, wherein the spiral groove partially extends circumferentially along the inner surface of the at least one aperture.

8. The mounting assembly of claim 1, further comprising at least one snap hook adjacent the peripheral edge of each of the mounting panels, the snap hook of one mounting panel of the at least two adjacent mounting panels configured to engage another mounting panel of the at least two adjacent mounting panels to secure the at least two adjacent mounting panels together.

9. The mounting assembly of claim 8, wherein each of the mounting panels includes at least one flange, the snap hook of one mounting panel configured to engage the flange of the other mounting panel to secure the adjacent mounting panels together.

10. The mounting assembly of claim 9, wherein the at least one flange defines at least a portion of the peripheral edge.

11. The mounting assembly of claim 1, further comprising an adhesive strip on the second rear surface of each of the mounting panels, the adhesive tape configured to engage a mounting surface to facilitate mounting to the mounting surface.

12. The mounting assembly of claim 1, further comprising:
at least one recess provided by the peripheral edge of each of the mounting panels;
at least one key;
wherein the recesses of the adjacent mounting panels align to form a keyhole and wherein the key is configured to be inserted into the keyhole to interlock the adjacent mounting panels together.

13. The mounting assembly of claim 12, wherein the at least one recess of each of the mounting panels is a dovetail recess.

14. The mounting assembly of claim 13, wherein the at least one key is a dovetail key.

15. The mounting assembly of claim 14, wherein an inner surface of each of the at least one recesses has an indentation.

16. The mounting assembly of claim 15, wherein the at least one key has a protrusion configured to be received within the indentation of the at least one recess of each of the mounting panels.

17. The mounting assembly of claim 16, wherein the at least one recess extends from the first front surface towards the second rear surface.

18. The mounting assembly of claim 17, wherein the at least one key is configured to be inserted into the keyhole in a direction generally perpendicular to the first front surface.

19. The mounting assembly of claim 1, wherein the spiral groove has a locking hole, the locking hole configured to receive one of the two projections of the mounting support when the mounting support is in the locked position.

* * * * *